June 15, 1954

J. W. SHERWEN 2,681,419

ELECTROMAGNETIC VIBRATING EQUIPMENT

Filed July 15, 1952

INVENTOR
JOSEPH WILLIAM SHERWEN

BY

ATTORNEY

June 15, 1954   J. W. SHERWEN   2,681,419
ELECTROMAGNETIC VIBRATING EQUIPMENT
Filed July 15, 1952   5 Sheets-Sheet 2
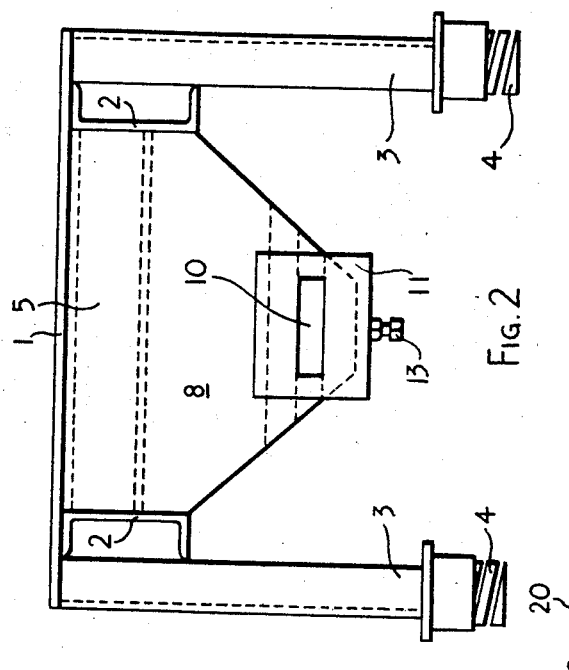
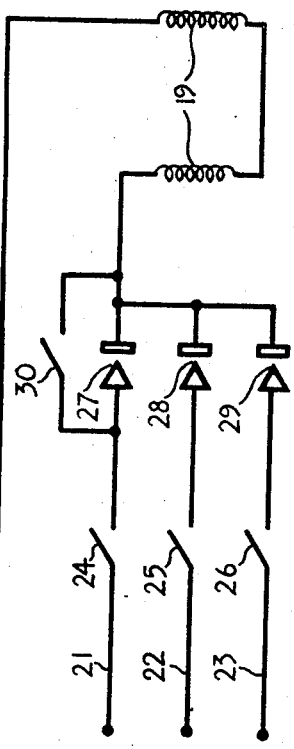
INVENTOR
JOSEPH WILLIAM SHERWEN
ATTORNEY June 15, 1954 J. W. SHERWEN 2,681,419
ELECTROMAGNETIC VIBRATING EQUIPMENT
Filed July 15, 1952 5 Sheets-Sheet 3
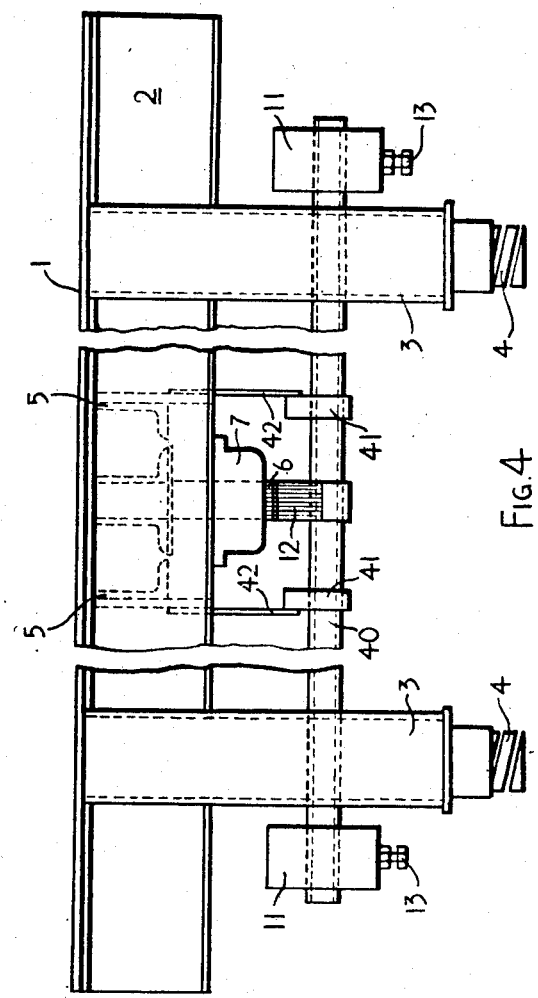
INVENTOR
JOSEPH WILLIAM SHERWEN
BY
ATTORNEY June 15, 1954  J. W. SHERWEN  2,681,419
ELECTROMAGNETIC VIBRATING EQUIPMENT
Filed July 15, 1952  5 Sheets-Sheet 4

INVENTOR
Joseph William Sherwen
BY
ATTORNEY

June 15, 1954
J. W. SHERWEN
2,681,419
ELECTROMAGNETIC VIBRATING EQUIPMENT
Filed July 15, 1952
5 Sheets-Sheet 5
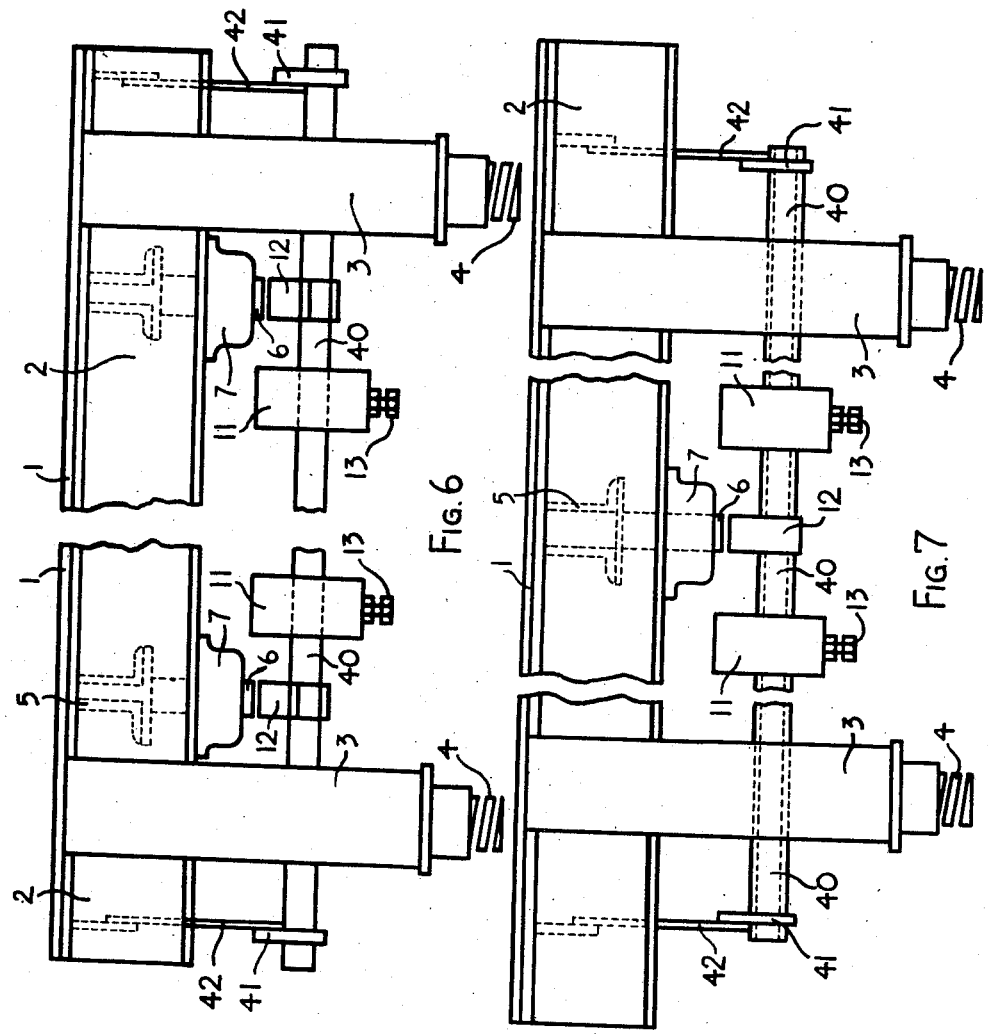
INVENTOR
JOSEPH WILLIAM SHERWEN
BY
ATTORNEY

Patented June 15, 1954

2,681,419

UNITED STATES PATENT OFFICE 2,681,419

ELECTROMAGNETIC VIBRATING
EQUIPMENT

Joseph William Sherwen, Erith, England, assignor to The General Electric Company Limited, London, England Application July 15, 1952, Serial No. 298,945

11 Claims. (Cl. 310—29)

This invention relates to electro-magnetic vibrating equipment and more particularly, but not exclusively to such equipment for operation either directly or through a half-wave rectifier from an alternating current electric supply.

One object of the present invention is the provision of equipment in which the natural frequency of vibration of the equipment can be rapidly changed from one frequency to another.

According to the present invention, electro-magnetic vibrating equipment comprises a table, deck, screen or the like arranged to be supported in a resilient manner, a support carried by the table, deck, screen or the like or a part rigidly attached thereto, and supporting a spring beam, electro-magnetic means for vibrating the beam, and a weight adjustable in position along the length of the beam.

If the equipment is to be operated from current derived from a 50 cycle A. C. electric supply and is to vibrate either at 3,000 or 6,000 cycles per minute, then the weight need only have two positions of adjustment on the beam. If, however, the frequency of the electro-magnetic means is variable, then the weight may have more than this number of positions. Thus the weight may slide along the beam and be clamped in any selected position.

In one form of construction in accordance with the present invention, the beam is supported at a central part of its length and two weights are provided, one on each half of the beam. Preferably, each half is arranged to be vibrated by separate and individual electro-magnetic means and these would act on the beam between its support and the weights.

In another form of construction in accordance with the present invention, the beam is supported at two points equidistant from its centre by two plate springs and a single electro-magnetic means is disposed between the two plate springs and is arranged to cause vibration of both halves of the beam.

In a further form of construction in accordance with the present invention the beam is supported at two points equidistant from its centre by plate springs and two electromagnetic means are disposed spaced apart along the beam equidistantly from the centre and two weights adjustable along the beam are mounted between the electro-magnetic means.

In another form of construction the beam is supported at two points equidistant from its centre by plate springs, a single electro-magnetic means is mounted at the centre and two weights adjustable along the beam are mounted between the electro-magnetic means and the supporting springs.

Four embodiments of the present invention will now be described by way of example with reference to the accompanying drawings, in which:

Figure 2 is an end elevation of the same embodiment.

Figure 3 is an electrical circuit diagram of the apparatus.

Figure 4 is a side elevation of the second embodiment and Figure 5 is an end elevation of this second embodiment.

Figure 6 is a side elevation of the third embodiment; and

Figure 7 is a side elevation of the fourth embodiment.

Figure 1:
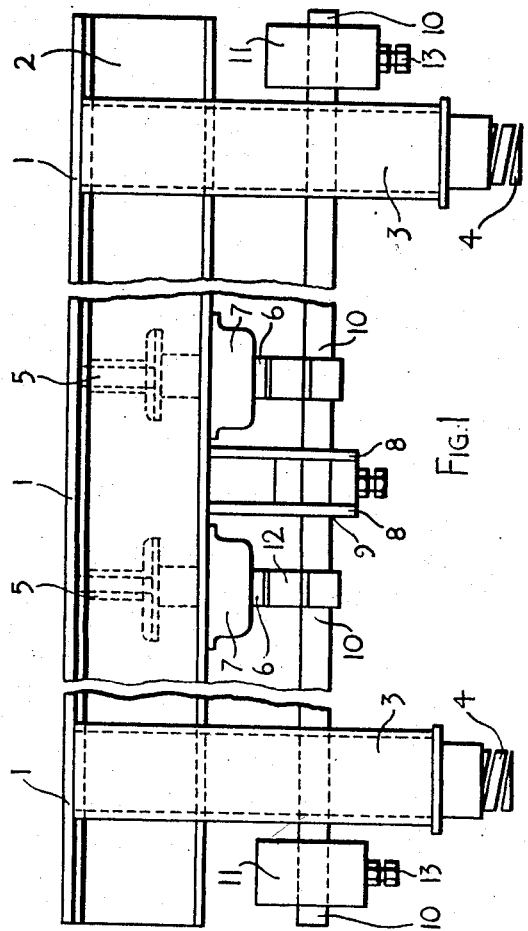
Figure 1 is a side elevation of one embodiment.

Referring to Figures 1 and 2 of the accompanying drawings, an electro-magnetic vibrating table suitable for laboratory work and arranged to be energised either direct from a 50 cycle A. C. supply or through a half-wave rectifier, comprises a horizontal steel table top 1 having channel-shaped steel side-members 2 running along the two longer sides of the table on its underside with the bases of the members vertical and the channels facing outwardly. The side members 2 are placed a short distance in from the sides of the table top 1 and the table top is supported on four vertical steel legs 3 each of channel section. Each leg is provided with a foot spring 4 so that the table top is supported in a resilient manner.

Running transversely of the length of the table top on the underside thereof and one set on each side of the transverse centre line of the top are two support members 5 for the vibrating equipment. The members 5 are spaced a short distance away from the said transverse centre line and each carries a solenoid coil, having a laminated core 6 disposed on the longer centre line of the table top and arranged to project vertically downwards from its coil. Each coil is enclosed by a coil cover 7 and the coils are arranged to be energised either in series or in parallel with alternating or pulsating current derived from the A. C. supply. The two cores 6 are rigidly attached to the table top and move with it.

Projecting downwardly from the underside of the table top at its centre and between the two support members 5 are two flat anchor plates 8 generally of triangular form with their narrower ends downwards. The anchor plates 8 are of steel and are parallel to one another and to the transverse centre line of the table. Towards their lower ends, each plate is provided with a rectangular aperture 9 and through these apertures which are in line there extends a steel spring beam 10 of rectangular section, which beam lies vertically beneath and parallel to the longer centre line of the table top. In length the beam 10 is somewhat shorter than the length of the table top and it is clamped rigidly at its centre to the two anchor plate 8. The beam 10 may be divided longitudinally into a number of sections and forms a spring capable of flexing about its central support formed by the anchor plates 8.

Each half of the beam 10 carries a weight 11 and is provided with a laminated armature 12 which co-operates with the solenoid core 6 just above the beam 10. There is a small air gap between each armature 12 and its associated solenoid core 6. When the solenoid coils are energised the beam halves vibrate.

As shown in Figure 3, the two coils 19 of the electro-magnetic solenoid are connected in series and may be fed with current derived from a 3 phase alternating current supply having four wires comprising three phases 21, 22 and 23 and a neutral 20. Switches 24, 25 and 26 are connected in the three phase wires 21, 22 and 23 respectively and dry contact rectifiers 27, 28 and 29 are connected between the said switches 24, 25 and 26 respectively and one end connection of the coils 19. The other end connection of the coils 19 is joined to the neutral wire 20. A switch 30 is provided for short circuiting the rectifier 27.

When the switch 24 is closed and the other switches are open a pulsating current will flow in the coils 19 due to the action of a rectifier 27. The frequency of the pulsating current will be that of the alternating current supply so that with a 50 cycle per second A. C. supply the vibrations will be at the rate of 3,000 per minute. If the switches 24 and 30 are closed, the other switches being open, alternating current will flow in the coils 19 giving two vibrations per cycle of alternating current so that the frequency of vibration will be doubled and be at the rate of 6,000 per minute. If the switch 30 is opened and the switches 24, 25 and 26 closed three pulsations of current will flow through the coils 19 during each cycle of the alternating current so the frequency of vibration will be trebled and be at the rate of 9,000 per minute.

In order that the natural frequency of the table may be altered quickly and easily to suit the 3,000 or 6,000 or 9,000 cycles per minute vibration, the weights 11 on the beam 10 are adjustable along the length of the beam. As will be appreciated, variation of the positions of the weights will vary the natural frequency of the whole table and, for this purpose, each weight consists of a heavy steel block having a sliding fit on the beam and provided with a locking screw 13 for fixing it firmly in a chosen position. If the table is required to operate at the lowest frequency, 3,000 cycles per second, then the weights 11 would be clamped towards the free ends of the beam and, if at one of the higher frequencies, they would be clamped nearer to the centre.

If a variable frequency A. C. supply is available, such as from a variable speed alternator, then the weights 11 can be adjusted along the beam 10 to positions corresponding with the frequency of the supply. As an alternative to the use of current derived from an A. C. supply, the solenoid coils may be fed with pulsating or interrupted direct current.

One advantage of the equipment described above is that since the armatures 12 are fairly close to the centre of the table and the weights 11 are outwardly of the armatures, a substantial movement (vibration) of the weights is permitted with good reaction on the table with only a small air gap between an armature 12 and its associated core 7. Another advantage of the equipment is that it is substantially lighter in weight than known arrangements.

Figure 5:
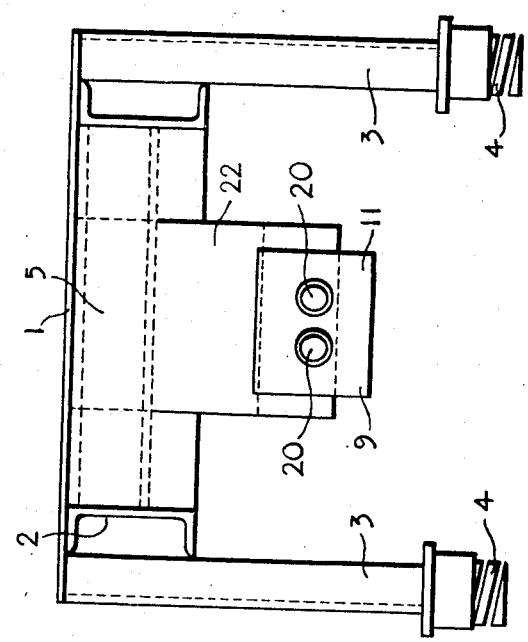

In the embodiment shown in Figures 4 and 5 of the accompanying drawings, the arrangement of the table 1 and its mountings are the same as those in the first embodiment shown in Figures 1 and 2. The differences reside in the way in which the spring beam and the means for vibrating it are arranged. The spring beam consists of two springy steel tubes 40 disposed side by side. At their centre the tubes 40 carry the laminated armature 12 of a single electromagnetic vibrator unit similar to one of the two vibrator units above described with reference to Figures 1 and 2. At two points equidistant from their centres the tubes 40 extend through blocks 41 secured to the tubes, the blocks 41 being connected to the support members 5 by plate springs 42 which extend in generally vertical planes.

The arrangement is such that when alternating or pulsating current is fed to the coil of the electro-magnetic solenoid the armature 12 is attracted periodically towards the core 6 so that both halves of the beam consisting of the tubes 40 are caused to vibrate in a generally vertical plane, flexure occurring about the blocks 41 and vertical forces being transmitted through the plate springs 42 to the table. The electrical circuit may be similar to that described with reference to Figure 3 of the accompanying drawings except that there will be a single solenoid coil 19 instead of the two coils shown in Figure 3. The weights 11 will require to be moved in the same way as above described with reference to Figures 1 and 2 in order to bring the system at least approximately into resonance with the alternating or pulsating current fed to the coil 19.

An advantage of the arrangement shown in Figures 4 and 5 is that the leaf springs 42 while transmitting vertical forces to cause vertical movement of the table 1 on its resilient mountings offer little restraint if it is desired to impart to the table oscillations in a horizontal direction at the same time as vertical oscillations are being imparted to it. This possibility may be useful if apparatus in accordance with the present invention is employed in a reversible conveyor or the like in accordance with the specification of my copending application Serial No. 272,425 filed February 19, 1952.

In the embodiment shown in Figure 6 of the accompanying drawings, the arrangement of the table 1 and its mountings are the same as those in the first embodiment shown in Figures 1 and 2. The spring beam consists of two springy steel tubes 40 disposed side by side. At points equidistantly spaced from the centre of the tubes 40 are two laminated armatures 12 of electromagnetic vibrator units similar to the units above described with reference to Figures 1 and 2. Towards their ends the tubes 40 extend through blocks 41 secured to the tubes, the blocks 41 being connected to the support members 5 by plate springs 42 which extend in generally vertical planes. Two weights 11 adjustable along the length of the tubes are mounted on the tubes between the electro-magnetic vibrator units and can be clamped in the desired position of adjustment by locking screws 13. Moving the weights 11 outwards away from the centre of the tubes 40 increases the natural frequency of vibration of the system and by adjustment of the positions of the weights it is possible to bring the system into resonance with the alternating or pulsating supply to the electro-magnetic vibrator units which may be derived from an arrangement as above described with reference to Figure 3.

In the fourth embodiment shown in Figure 7 of the accompanying drawings, the arrangement of the table and its mountings and of the tubes 40 is generally as above described with reference to Figure 6. In this embodiment, however, the tubes 40 carry at their centre the laminated armature 12 of a single electro-magnetic vibrator unit similar to the vibrator units above described. Two weights adjustable along the length of the tubes are mounted between the armature 12 and the plate springs 42. By moving the weights along the beam it is possible to adjust the natural frequency of vibration of the system into resonance with the alternating or pulsating supply to the electro-magnetic vibrator unit. By adjusting the weights outwardly away from the centre of the tubes 40 the natural frequency of vibration of the system is increased.

I claim:

1. Electro-magnetic vibrating equipment comprising a material supporting member, resilient mounting means for said material supporting member, a spring beam capable of flexural vibratory movement relatively to said material supporting member but coupled to impart vibrations thereto, electro-magnetic means for flexurally vibrating the spring beam, and a weight adjustable in position along the length of the beam to adjust the natural frequency of vibration of the beam and material supporting member.

2. Electro-magnetic vibrating equipment as set forth in claim 1, wherein the spring beam is supported centrally and two adjustable weights are provided one on each half of the beam extending from the point of support.

3. Electro-magnetic vibrating equipment as set forth in claim 1, wherein the spring beam is supported centrally and two adjustable weights are provided one on each half of the beam extending from the point of support, and wherein separate and individual electro-magnetic means are provided for vibrating each half of the beam.

4. Electro-magnetic vibrating equipment comprising a material supporting member, resilient mounting means for said material supporting member, a spring beam capable of flexural vibratory movement relatively to said material supporting member but coupled to impart vibrations thereto, electro-magnetic means for flexurally vibrating the spring beam, and a weight adjustable in position along the length of the beam to adjust the natural frequency vibration of the beam and material supporting member, said electro-magnetic means being arranged to act on the beam between its support and the adjustable weight.

5. Electro-magnetic vibrating equipment comprising a material supporting member, resilient mounting means for said material supporting member, a spring beam capable of flexural vibratory movement relatively to said material supporting member but coupled to impart vibrations thereto, two leaf springs coupling said spring beam to the material supporting member and disposed equidistantly about the center of said spring beam, electro-magnetic means for vibrating the spring beam disposed between said leaf springs, and weights adjustable in position along each half of the beam to adjust the natural frequency of vibration of said beam and material supporting member.

6. Electro-magnetic vibrating equipment as set forth in claim 5, wherein the spring beam comprises at least one tubular member.

7. Electro-magnetic vibrating equipment as set forth in claim 5, wherein the spring beam comprises two tubular members disposed side by side.

8. Electro-magnetic vibrating equipment comprising a material supporting member, resilient mounting means for said material supporting member, a spring beam capable of flexural vibratory movement relatively to said material supporting member but coupled to impart vibrations thereto, electro-magnetic means for vibrating the beam having a coil, means for feeding pulsating electric current to said coil and at least one weight adjustable in position along the length of the beam to adjust the natural frequency of vibration of the beam and material supporting member into resonance with the pulsating electric current.

9. Electro-magnetic vibrating equipment comprising a material supporting member, resilient mounting means for said material supporting member, a spring beam capable of flexural vibratory movement relatively to said material supporting member but coupled to impart vibrations thereto, two leaf springs coupling said spring beam to the material supporting member and disposed towards the end of said spring beam, electro-magnetic means for vibrating the beam disposed between said supports, and weights adjustable in position along the beam to adjust the natural frequency of vibration of said beam and material supporting member.

10. Electro-magnetic vibrating equipment as set forth in claim 9, having two electro-magnetic vibrating means disposed equidistantly about the center of the beam.

11. Electro-magnetic vibrating equipment as set forth in claim 9, having a single electro-magnetic vibrating means at the center of the beam.

References Cited in the file of this patent

UNITED STATES PATENTS

| Number | Name | Date |
|---|---|---|
| 1,396,337 | McDonald | Nov. 8, 1921 |
| 1,772,596 | Traylor | Aug. 12, 1930 |
| 1,846,326 | Flint | Feb. 23, 1932 |
| 2,280,610 | Young | Apr. 21, 1942 |